April 15, 1941.                J. FRIEDEL                2,238,387
                                  VALVE
                           Filed Dec. 16, 1939
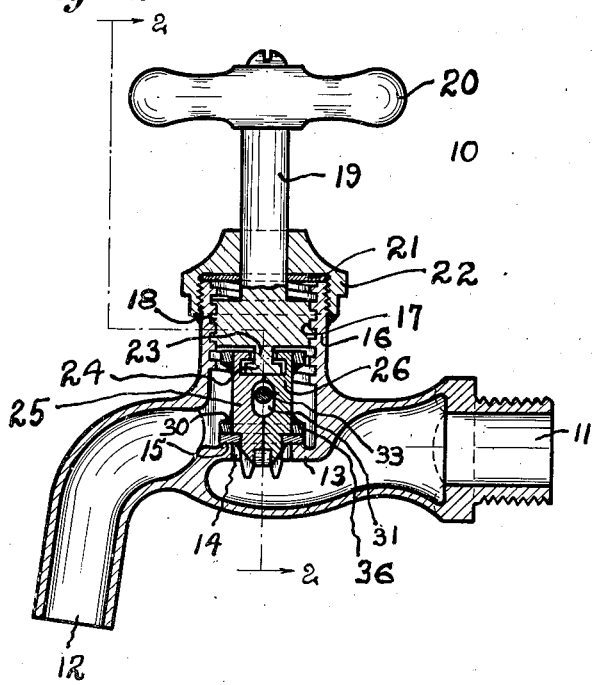
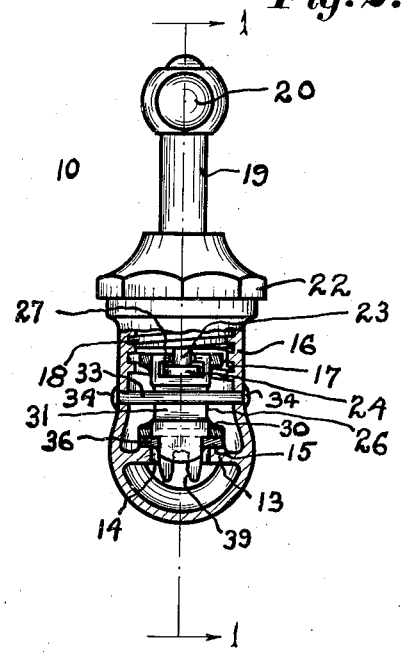
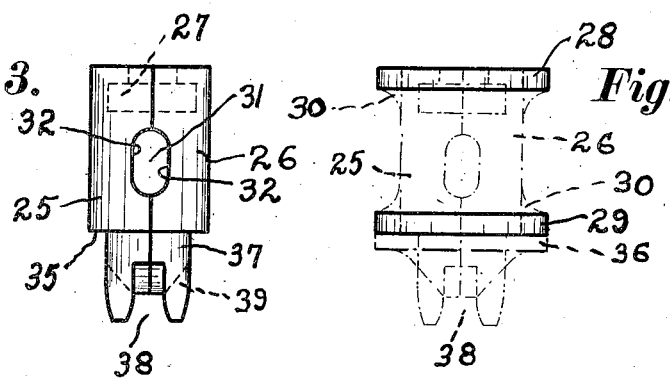
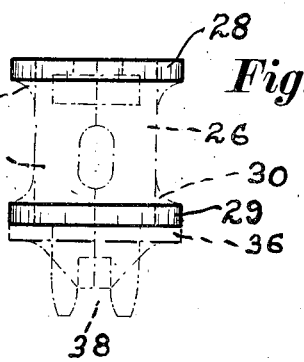
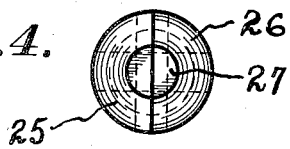
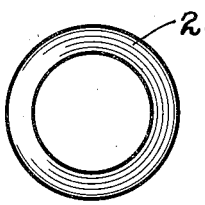
Inventor
Jonas Friedel
By Arthur H. Sturges
                                                    Attorney Patented Apr. 15, 1941

2,238,387

UNITED STATES PATENT OFFICE 2,238,387

VALVE

Jonas Friedel, Omaha, Nebr.

Application December 16, 1939, Serial No. 309,645

5 Claims. (Cl. 251—44)

This invention relates to valves and has for an object to provide a valve with a head so constructed and arranged that said head will always return to an initial position with respect to the valve-seat during use.

More particularly it is an object of the invention to provide a valve construction so arranged that the valve-head thereof is prevented from rotation with respect to the valve-seat and at times when the valve-stem thereof is rotated for moving said head away from and against said seat for opening and closing the latter.

Another object of the invention is to provide a valve so constructed and arranged that the valve may be opened for a gradual and minute passage of water or the like through said valve initially without using care as heretofore required or may be opened fully and in a usual manner for causing a volume of liquid to pass therethrough proportional to the capacity or size of the valve.

Other and further objects and advantages of the invention will be understood from the following detailed description thereof, reference being had to the accompanying drawing in which:

Figure 1 is a longitudinal, vertical section of a valve which embodies the present invention, the view being taken on line 1—1 of Figure 2.

Figure 2 is an end view thereof partly in section, the view being taken on line 2—2 of Figure 1.

Figure 3 is a side elevation of a two piece valve-head preferably employed.

Figure 4 is a top plan view of the valve-head shown in Figure 3.

Figure 5 is a view depicting diagrammatically a manner of and means for attaching the two piece construction of said valve-head together.

Figure 6 is a plan view of one ring of a pair of rings which are preferably employed for attaching said two pieces of said head together.

It is well known that heretofore inefficiency has been encountered in the construction and operation of valves resultant from the valve-seats thereof becoming corroded and rugose whereby said seats require grinding intermittently in order for a metallic valve-head to close snugly against its seat. Also as is well known at times when the conventional washer which abuts against the valve-seat is formed of rubber, the latter wears out rapidly resultant from a rotary motion being applied to said rubber gasket or washer for closing the washer against the valve-seat, contact with the latter grinding said gasket against said seat whereby rubber gaskets require replacement from time to time in accordance with the amount of use and wear applied thereto. Resultant from the said condition valves of water faucets for water under pressure leak causing annoyance as well as a costly waste of water and it is a further object of the present invention to provide means for obviating the undesirable features of the prior practice.

Referring now to the drawing 10 indicates generally the new valve mechanism which is depicted in connection with a water faucet having a conduit provided with an intake 11 and an outlet port 12. Between said intake and outlet a wall 13 is disposed across the conduit. An aperture 14 is disposed through the wall 13 and a valve-seat 15 extends about or encircles said aperture 14.

The valve-cage 16 is provided with a screw thread 17 upon the interior annular wall thereof, said thread being complemental to and in engagement with the thread 18 of a valve-stem 19, the latter extending outwardly of said valve-cage being provided with a finger-hold lever 20 for facilitating a rotation of said stem. A gasket 21 is disposed between the upper end of the cage and a pack-nut 22, the latter also providing a bearing for said stem. That pintle end 23 of the stem which is disposed within the cage is provided with a flared head 24 for purposes later described, said flared pintle head being disposed axially with respect to said stem and cage.

The new valve-head is preferably of two piece construction for facilitating an attachment thereof to said pintle end.

As best shown in Figure 3, said head includes a half portion 25 and an oppositely disposed half portion 26, said portions being so constructed that when abutted together, as shown in Figures 3 and 4, a recess 27 is provided at one end thereof. The recess 27 is of a complemental shape with respect to said pintle end, the latter being received within said recess for pivotally attaching said head and valve-stem together, said half portions of the head being secured together after said pintle end is disposed in said recess by any suitable means such as rivets or the like, rings being preferably employed for this purpose.

As shown in Figures 5 and 6, the rings are provided with parallel sides, the ring 28 being disposed about the head portions 25 and 26 adjacent the recess 27 of said head and a like ring 29 about and adjacent the other end of said head, said rings being secured to said head by any suitable means such as the solder 30.

Between the ends of the head when assembled as above described a slot 31 is preferably provided which extends transversely through said head, said slot being elongated in the direction of said recess 27 and provided with parallel side walls 32.

A suitable detent is provided for preventing rotary movement of said head at times when the valve-stem 19 is rotated for moving said head away from and against the valve-seat 15 for opening and closing said valve. The said detent may be any one of several forms and preferably includes a pin 33 which, as best shown in Figure 2, extends through the slot 31 snugly engaging the side walls of said bore. One or both ends of the pin 33 are secured to the walls of the valve-cage 16 and, as specifically shown in Figure 2, said pin 33 extends through said walls, the ends of the pin being peened against the outer surfaces of said walls as at 34. As thus described it will be understood that the end 35, best shown in Figure 3, of the valve-head is adapted to abut against the valve-seat 15 for closing the aperture 14 at times when the valve is employed for preventing or permitting a flow of certain liquids such as chemicals or the like from a container, said liquids being such that a contact with certain metals would damage said liquid and also may be employed in connection with oils which rapidly deteriorate the rubber gaskets of valves.

For certain types of uses said end 35 is preferably provided with a washer 36 formed of comparatively soft metal such as lead, pewter or the like which is secured to said end by means of solder, rivets or any suitable means. For use in connection with other substances, such as water or the like, the washer 36 may be formed of rubber.

As thus described it will be noted that since said valve-head and the washer 36 are prevented from rotation said washer is always returned to an initial position with respect to the valve-seat at times when moved away from said seat resultant from a rotation of the stem 19 during an opening and closing of said seat and the aperture 14 of the wall 13 whereby the washer 36 when compacted against said seat by the valve-stem 19 is caused to be provided with a contour on that face thereof which is oppositely disposed with respect to said seat which is complemental to said seat and the interstices of the latter, whereby a leakage of liquid under pressure is prevented and a passage of said liquid between said seat and valve-head prevented at times when the valve is closed.

For use in connection with water faucets and particularly for use in connection with the plumbing systems of dwelling houses the end 35 of the valve-head is preferably provided with a boss 37 which may be formed integral with the half portions 25 and 26 of said head.

The boss 37 is provided with two slots 38 and 39 which intersect each other at right angles. The slots 38 and 39 are alike with respect to each other and are best shown in Figures 3 and 2, respectively. As shown in Figure 3, said slots are arcuate in section, the ends thereof being disposed toward the end 35 of the valve-head for dividing an outlet of a stream of water passing through the aperture 14, the construction and arrangement thereof being such that at the time the valve-head is raised away from the valve-seat the initial flow of water is minute and remains so until the valve is opened widely which is of advantage at times when an operator desires a small flow of water from the faucet and is not careful in slowly rotating the valve-stem 19 initially for providing an outlet of water of desired small quantity and particularly is useful at times when the degree of presure is excessive.

From the foregoing description it is thought to be obvious that a valve constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish it to be understood as limiting myself to the precise arrangement and formation of the several parts herein shown in carrying out my invention in practice except as claimed.

I claim:

1. A device for the purpose described comprising a conduit, a wall within and disposed across said conduit, said wall being provided with an aperture through which a substance is adapted to pass, a valve-seat carried by said wall, said seat being disposed about said aperture, a valve-head comprising oppositely disposed abutting half portions and having an end adapted to abut against said seat for sealing said aperture, the other end of said head being provided with a recess having a flanged inner end, said head being provided with a slot disposed across said seat, said slot being elongated in the direction of said recess, a valve-stem having a pintle end of complemental contour with respect to said flanged recess and disposed in the latter, means for connecting said stem and head together, means including screw-threads for causing said head to move toward and away from said seat during a rotation of said stem, and means for preventing a rotary movement of said head with respect to said seat during rotation of said stem, said preventing means comprising a pin disposed through said slot, the ends of said pin being secured to said conduit.

2. A valve device comprising a valve cage, a valve stem having a flanged pintle end, said cage and stem provided with complemental screw threads in engagement with each other whereby said stem may be rotated for causing a longitudinal movement of said stem with respect to said cage, a valve seat having an aperture within said cage, a valve head for sealing said aperture, said head comprising oppositely disposed abutting half portions, said portions provided at their upper ends with recesses complemental to said flanged pintle end and engaged thereon, rings securing said portions to said pintle end, said portions being provided with a central slot, means extending through said slot and secured to said valve cage to prevent rotary movement of said head with respect to said seat during rotation of said stem, and flow regulating means integral with said valve head and disposed within the seat aperture, said regulating means being operative on longitudinal movement of said stem and valve head away from said seat.

3. A device as defined in claim 2, the means to prevent rotary movement comprising a pin disposed in said slot.

4. A device as defined in claim 2, the means comprising the flow regulator comprising a boss formed on the valve head.

5. A valve device comprising a valve-cage, a valve-stem having a flanged pintle end, said cage and stem provided with complemental screw threads in engagement with each other whereby said stem may be rotated for causing a longitudinal movement of said stem with respect to said cage, a valve-seat having an aperture within said cage, a valve-head for sealing said aperture, said head comprising oppositely disposed abutting half portions, said portions provided at their upper ends with recesses complemental to said flanged pintle end and engaged thereon, rings securing said portions to said pintle end, said portions being provided with a central slot, means extending through said slot and secured to said valve-cage to prevent rotary movement of said head with respect to said seat during rotation of said stem, and a boss formed on the valve-head and disposed within the said aperture, said boss being operative on longitudinal movement of said stem and valve-head away from said seat to regulate a flow of substance through said valve, said boss being provided with intersecting slots.

JONAS FRIEDEL.